US011325700B2

(12) United States Patent
Maxwell

(10) Patent No.: US 11,325,700 B2
(45) Date of Patent: May 10, 2022

(54) HYPERSONIC WAVERIDER STREAM SURFACE ACTUATION FOR VARIABLE DESIGN POINT OPERATION

(71) Applicant: The Government of the United States of America, as represented by the Secretary of the Navy, Arlington, VA (US)

(72) Inventor: Jesse R. Maxwell, Silver Spring, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 369 days.

(21) Appl. No.: 16/042,622

(22) Filed: Jul. 23, 2018

(65) Prior Publication Data

US 2019/0112032 A1 Apr. 18, 2019

Related U.S. Application Data

(60) Provisional application No. 62/535,473, filed on Jul. 21, 2017.

(51) Int. Cl.
*B64C 30/00* (2006.01)
*B64F 5/00* (2017.01)
*B64C 3/48* (2006.01)
*B64C 1/00* (2006.01)
*B64C 3/44* (2006.01)

(52) U.S. Cl.
CPC ............ *B64C 30/00* (2013.01); *B64C 1/0009* (2013.01); *B64C 3/48* (2013.01); *B64F 5/00* (2013.01); *B64C 2001/0045* (2013.01); *B64C 2003/445* (2013.01)

(58) Field of Classification Search
CPC ....... B64C 23/04; B64C 30/00; B64C 1/0009; B64C 2001/0045; B64C 1/28; B64C 1/30; B64C 1/38; B64C 3/48; B64C 3/52; B64C 2003/445
See application file for complete search history.

(56) References Cited

U.S. PATENT DOCUMENTS

| | | | | |
|---|---|---|---|---|
| 6,634,594 B1 * | 10/2003 | Bowcutt | ................... | B64C 3/10 244/35 A |
| 7,461,820 B2 * | 12/2008 | Grove | ...................... | B64C 3/48 244/219 |
| 7,866,599 B2 * | 1/2011 | Elvin | ...................... | B64C 30/00 244/53 B |

(Continued)

*Primary Examiner* — Joshua J Michener
*Assistant Examiner* — Arfan Y. Sinaki
(74) *Attorney, Agent, or Firm* — US Naval Research Laboratory

(57) ABSTRACT

A method of designing a hypersonic vehicle includes selecting a shock shape; tracing a leading edge along the shock shape; selecting a base plane defining endpoints of the leading edge and rearwardly displaced from a front of the leading edge; and tracing stream surfaces back from the leading edge along the shock to the base plane in order to define an upper surface and a lower surface, wherein the upper and lower surfaces and base plane enclose a volume representing internal volume of the hypersonic vehicle. The lower stream surface is controllably morphable.

5 Claims, 8 Drawing Sheets

(56) References Cited

U.S. PATENT DOCUMENTS

| | | | | |
|---|---|---|---|---|
| 8,256,706 B1* | 9/2012 | Smith | ................... | B64D 33/02 |
| | | | | 137/15.1 |
| 2009/0302168 A1* | 12/2009 | Hetrick | .................. | B64C 27/72 |
| | | | | 244/214 |
| 2019/0061910 A1* | 2/2019 | Kota | ........................ | B64C 3/48 |

* cited by examiner

HYPERSONIC WAVERIDER STREAM SURFACE ACTUATION FOR VARIABLE DESIGN POINT OPERATION

RELATED APPLICATIONS

This application claims the benefit of U.S. Provisional Application No. 62/535,473 filed Jul. 21, 2017, which is hereby incorporated herein by reference.

FIELD OF INVENTION

The present invention relates generally to hypersonic flight, and more particularly to hypersonic waverider design and actuation.

BACKGROUND

Hypersonics is the flight regime characterized by conditions in which high temperature and extreme heat flux dominate the flow physics. This regime spans high speed aircraft around Mach 5 through atmospheric entry of spacecraft at Mach 25 to 30. In the late 1950s, Terrence Nonweiler proposed a supersonic vehicle shaped for which a planar shock remains attached all along its leading edge. The top surface of the vehicle would be everywhere tangent to the freestream flow in order to not disturb it, and the lower surface would be defined by the stream surface that emanates from the leading edge. The vehicle would therefore not disturb the post-shock flow from inviscid theory, and a high pressure region is therefore bounded by the vehicle lower surface and the shock wave. Such a vehicle then "rides" the high pressure region contained between the body and the attached shock, providing significant advantages for compression lift in the hypersonic regime. Early designs include the "caret" waverider, which is derived from a planar shock and resembles a sharp wedge.

Later adaptations included non-planar shocks, such as produced by a conical body, and added viscous drag as a consideration in determining performance metrics. The solution to the Taylor-Maccoll equation for the similarity flow field about an axisymmetric cone led to the use of conical-shock-derived waverider geometries.

SUMMARY OF INVENTION

To approach the issue of point-design for waveriders, moveable flaps or an actuated leading edge have been proposed. While these concepts intend to address the attachment of a shock to the leading edge across varied Mach conditions, they do not address the resulting issue of the post-shock stream surface and the disturbances introduced into the near-body flow by a vehicle lower surface that does not conform to the desired flow path of the post-shock streamlines. This nonconformity to the stream surface invalidates the application of the design flow field behind the shock and results in performance that cannot be easily predicted using convenient methods. Nor is the feasibility of heating addressed, which is of critical importance for minimizing bluntness of a hypersonic leading edge in order to maximize the vehicle performance compared to an ideally sharp geometry.

According to one aspect of the invention, a method of designing a hypersonic vehicle includes selecting a shock shape; tracing a leading edge along the shock shape; selecting a base plane defining endpoints of the leading edge and rearwardly displaced from a front of the leading edge; and tracing stream surfaces back from the leading edge along the shock to the base plane in order to define an upper surface and a lower surface, wherein the upper and lower surfaces and base plane enclose a volume representing internal volume of the hypersonic vehicle, and wherein the lower stream surface is controllably morphable.

According to another aspect, a hypersonic vehicle includes a leading edge; a base defining ends of the leading edge; an upper surface extending from the leading edge to the base; and a lower surface extending from the leading edge to the base, wherein the lower surface is controllably morphable, wherein the upper and lower surfaces and base enclose an internal volume of the hypersonic vehicle.

Optionally, the hypersonic vehicle includes a plurality of actuators configured to morph the lower surface in reaction to flight conditions.

Optionally, the lower surface is unitary.

According to another aspect, a method of controlling a hypersonic vehicle includes sensing an applied force by one or more actuators; actuating, via the one or more actuators, a unitary morphable lower surface of a hypersonic vehicle to a shape resulting in a minimum of applied force from each of the one or more actuators.

The foregoing and other features of the invention are hereinafter described in greater detail with reference to the accompanying drawings.

DETAILED DESCRIPTION

Figure 1A:
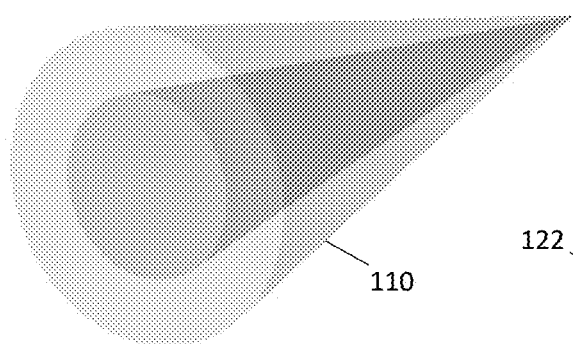
FIG. 1A-1F shows an exemplary construction method of an exemplary waverider.
Figure 1B:
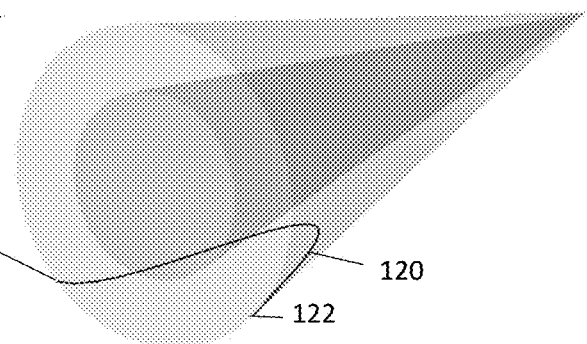
Figure 1C:
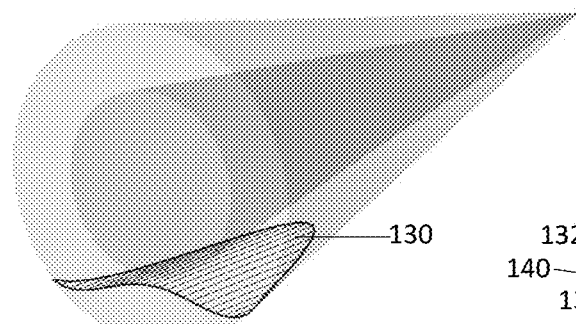
Figure 1D:
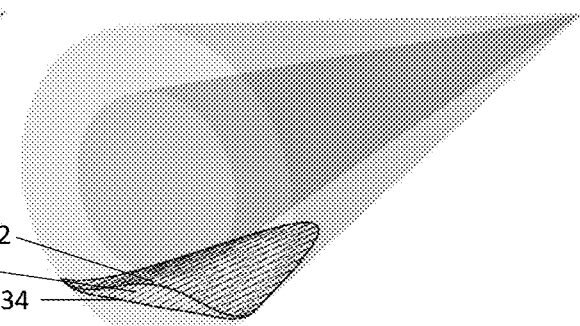
Figure 1E:
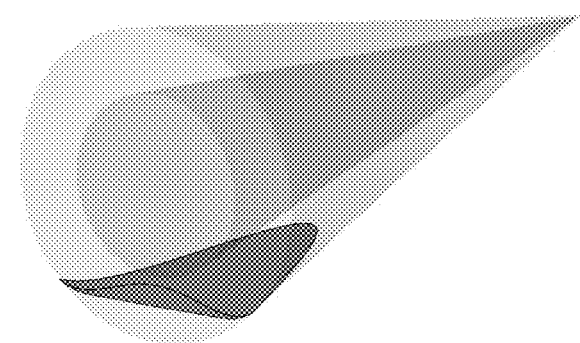
Figure 1F:
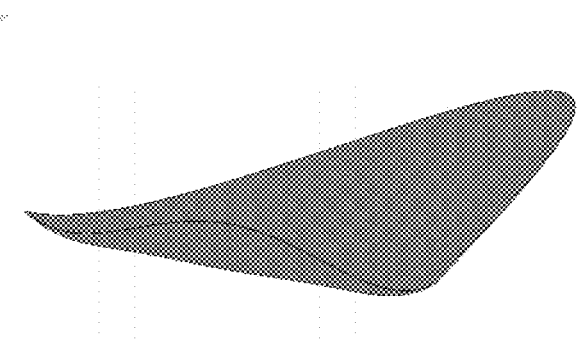

Analytical methods may be used to construct exemplary hypersonic waveriders that operate across a wide range of Mach numbers. A conical-shock-derived waverider is used as a case study to specifically illustrate the method and performance results.

The generic construction method is depicted in FIG. 1 for an example of conical shock. Beginning with a selected shock shape 110 (a), one traces a leading edge 120 along the shock (b). Shock and leading edge symmetry about a vertical plane ensures symmetrical aerodynamic forces, while constructing the vehicle below a horizontal symmetry plane such as the example conical shock ensures a lifting body will result. Stream surfaces 130 are traced back from the shock in order to form each stream surface element, as depicted in (c) for the upper surface 132 and (d) for the lower surface 134. The point at which the stream surfaces are truncated downstream of the shock is termed the base plane 140 and is a free design variable. Note that the termination point of each streamline need not be coplanar, as depicted in this case study (thus the more generic term "base" 140, may be used). The upper and lower stream surfaces and base plane enclose a volume that represents the internal vehicle volume, illustrated in the context of the conical shock flow field in (e) and the resulting vehicle alone in (f).

Although conical shocks are primarily used herein to illustrate the invention, any suitable shock paradigm may be used, including, for example, wedge shock, osculating flow fields, power-law body shocks, and generic/arbitrary shock shape.

It is noted that a utility of the osculating flow field method is in the added degrees of freedom for vehicle design, although it is a further-removed approximation of exact flow fields. Waveriders produced from wedge or conical shocks with high glide ratios tend to also yield low internal volume. The osculating method, by contrast, enables one to use piecewise variation of the flow field to produce a central fuselage region with high payload volume while allowing much thinner wing sections that will reduce drag.

In the osculating flow field method, the three-dimensional flow field is deconstructed into coincident planes that span the vertical and streamwise directions. A unique, two-dimensional slice of a design shock may be defined on each of these planes. The design variables for each plane include the desired shock angle, the shock intersection with the base plane, and the leading edge location. The method is dependent on the assumption that the piecewise-constructed composite flow field produces a smooth, continuous three-dimensional shock with minimal cross flow between planes. In practice, the flow fields are defined on discrete offset planes and the three-dimensional flow field is interpolated between them. An important caveat for this method is that each plane is a two-dimensional approximation of a three-dimensional inviscid flow field that does not account for crossflow between vertical planes. These cross flow components become increasingly important at lower Mach numbers and planar cross sections that deviate from the vertical center plane of an axisymmetric flow field. Conversely, for small deviations from vertical center planes and large Mach number, this method becomes increasingly valid in the context of inviscid flow theory.

The basic conical-shock method can be recovered as the number of osculating planes approaches infinity and each planar flow field has the appropriate two-dimensional slice of the three-dimensional conical flow field assigned to it.

Figure 2:
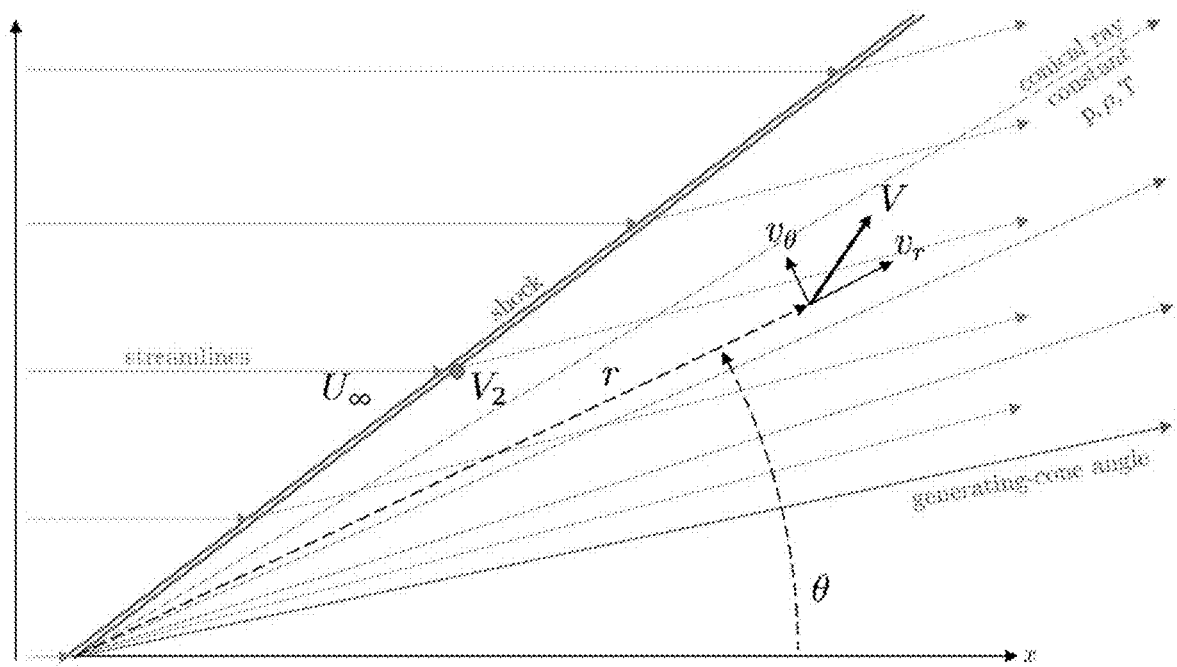
FIG. 2 shows the Taylor-Maccoll inviscid cone similarity solution.

The Taylor-Maccoll differential equations for inviscid compressible continuum flow past an axisymmetric cone produce a similarity solution for the post-shock flow field, depicted in FIG. 2, and are given as:

$$\frac{\gamma-1}{2}\left(1-V_r^2-\left(\frac{dV_r}{d\theta}\right)^2\right)\left(2V_r+\cot\theta\frac{dV_r}{d\theta}+\frac{d^2V_r}{d\theta^2}\right)-$$
$$\frac{dV_r}{d\theta}\left(V_r\frac{dV_r}{d\theta}+\frac{dV_r}{d\theta}\frac{d^2V_r}{d\theta^2}\right)=0$$

$$V_\theta = \frac{dV_r}{d\theta}$$

the solution to which is found by integrating the equation from the shock angle, $\beta$, to the point when $$\frac{dV_r}{d\theta} = 0,$$

corresponding to the cone surface. The classical Runge-Kutta 4th-Order method is implemented in the present work, and the zero-crossing to determine the cone angle is interpolated with cubic splines. An angular increment step size of 0.1° is used in the present work, empirically found to be more than sufficient to determine the cone angle consistently to within two significant figures.

The shock angle is chosen and the imaginary generating-cone angle is computed using the method described above. Often the inverse problem is presented: a cone angle and Mach number are given and the shock angle and flow field solution are desired. To solve this configuration, a nested Bisection method (or similar, e.g. Newton's Method) is implemented to converge on the desired cone angle with bracketed estimates of the shock angle. The solution the Taylor-Maccoll equation represents a flow field of a single similarity variable, with solutions in the form of $v_r(\theta)$ and $v_\theta(\theta)$ where flow field variables along a ray of constant $\theta$ emanating from the cone vertex are constant. Flow field variables only vary across rays, illustrated in FIG. 2.

First, the altitude, Mach number, and shock angle are specified. Next, the Oblique Shock Relations given in Eqns. 2 are used to compute the post-shock flow field variables, p, $\rho$, T. This constitutes the initial condition along the internal shock surface, for which the flow field variables are exactly known.

$$\cot\delta = \tan\beta\left(\frac{\gamma+1M^2}{2M^2\sin^2\beta-1}-1\right) \quad (2a)$$

$$M_2^2\sin^2(\beta-\delta) = \frac{(\gamma-1)M^2\sin^2\beta+2}{2\gamma M^2\sin^2\beta-(\gamma-1)} \quad (2b)$$

$$\frac{T_2}{T_1} = \frac{(2\gamma M^2\sin^2\beta-(\gamma-1))((\gamma-1)M^2\sin^2\beta+2)}{(\gamma+1)^2 M^2\sin\beta} \quad (2c)$$

$$\frac{p_2}{p_1} = \frac{2\gamma M^2\sin^2\beta-(\gamma-1)}{\gamma+1} \quad (2d)$$

$$\frac{\rho_2}{\rho_1} = \frac{(\gamma+1)M^2\sin^2\beta}{(\gamma-1)M^2\sin^2\beta+2} \quad (2e)$$

The similarity variable, the ray angle, is then spatially integrated from the post-shock surface to the surface of the imaginary generating body. The terminating angle occurs when $$V_\theta = \frac{dV_r}{d_\theta} = 0 \quad (3)$$

Figure 3:
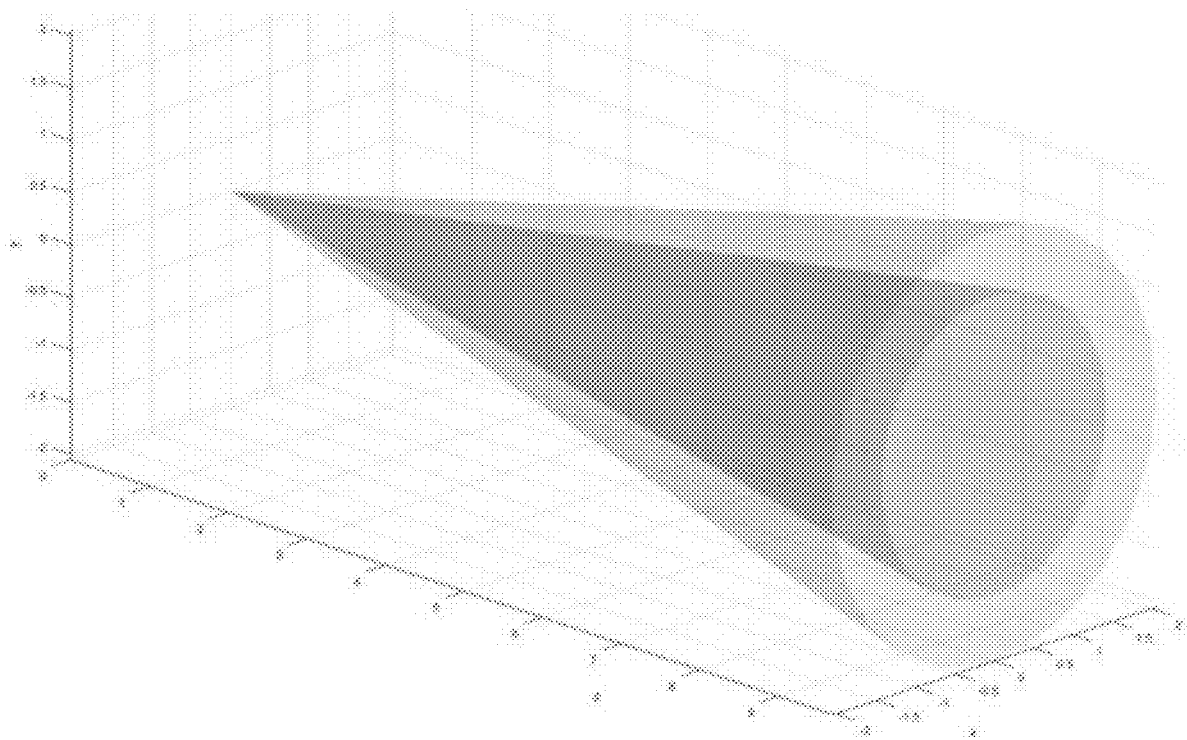
FIG. 3 shows a conical generating body (interior) and shock (exterior)

Since the discrete spatial marching will overshoot the cone angle, cubic interpolation is used to find the zero crossing and better approximate the cone angle. The resulting flow field may be visualized as coincident cones with different surface angles as depicted in FIG. 3. The resulting flow field solution is combined with the stagnation and post-shock relations given in Eqns. 3 to compute the flow field variables as a function of the angle between the shock and the generating body with local Mach number.

$$T_0 = T_\infty \left(1 + \frac{\gamma-1}{2}M^2\right) \quad (3.\text{a})$$

$$p_0 = p_\infty \left(\frac{(\gamma+1)M^2}{2+(\gamma-1)M^2}\right)^{\frac{\gamma}{\gamma-1}} \left(\frac{\gamma+1}{2}M^2 - (\gamma-1)\right)^{\frac{1}{\gamma-1}} \quad (3.\text{b})$$

$$\rho_0 \equiv \frac{p_0}{\left(\frac{8.31446}{0.028966 T_0}\right)} \quad (3.\text{c})$$

$$T = \frac{T_0}{1 + \frac{\gamma-1}{2}M^2} \quad (3.\text{d})$$

$$p = \frac{p_0}{\left(1 + \frac{\gamma-1}{2}M^2\right)^{\frac{\gamma}{\gamma-1}}} \quad (3.\text{e})$$

$$\rho = \frac{\rho_0}{\left(1 + \frac{\gamma-1}{2}M^2\right)^{\frac{1}{\gamma-1}}} \quad (3.\text{f})$$

Figure 4:
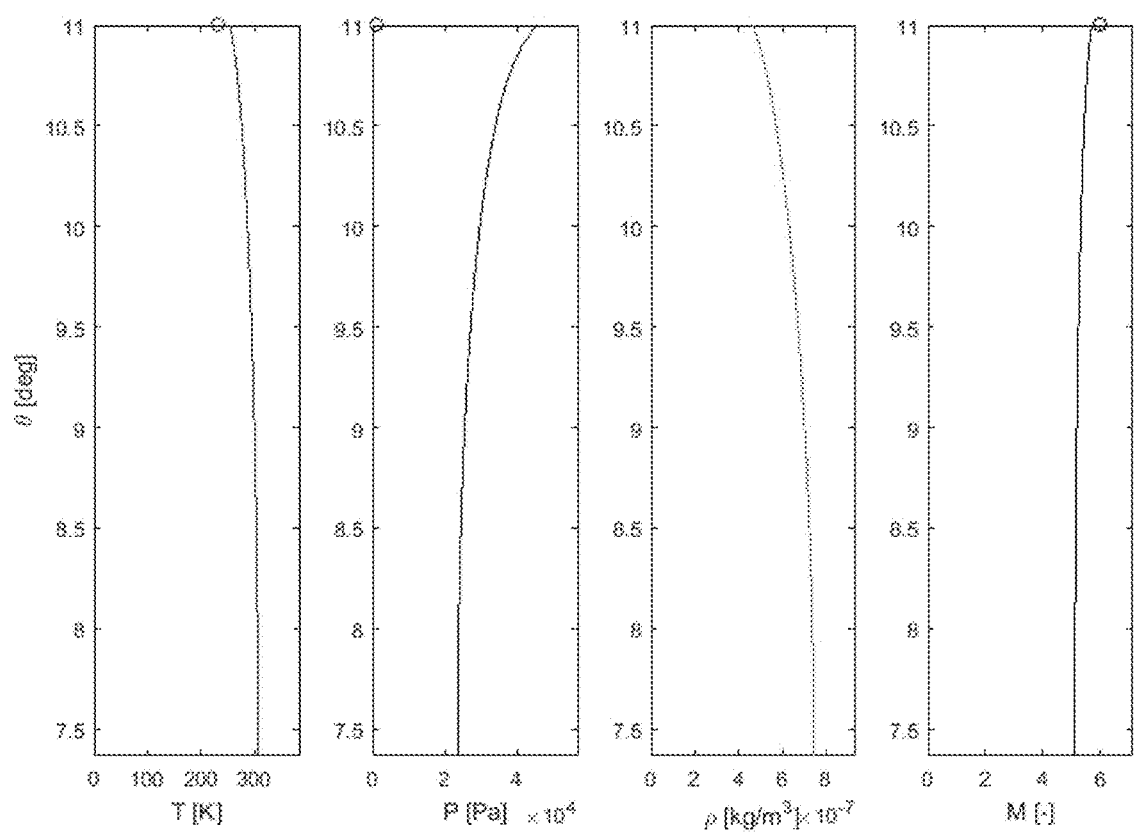
FIG. 4 shows a sample Taylor-Maccoll similarity solution for Mach 6 at 30 km altitude and 11° shock angle.

The numerical solution for an example flow field variable set is depicted in FIG. 4.

The friction coefficient can be approximated on each panel as that of a compressible laminar flat-plate boundary layer for panel-center Reynolds numbers below the critical value of $5 \times 10^5$ using empirical correlations and a reference temperature method as:

$$C_{f,lam} = 0.664 / \sqrt{Re_x^*} \quad (4)$$

where $Re_x^*$ is computed from fluid properties at the reference temperature T*, given by $$T^* = T_e\left(1 + 0.0032 M_e^2 + 0.58\left(\frac{T_h}{T_e} - 1\right)\right) \quad (5)$$

and the boundary layer edge temperature, $T_e$, is referenced as the inviscid wall temperature. For turbulent flow, the friction factor for Reynolds numbers above the critical value is approximated as $$C_{f,turb} = 0.0592/(Re_x^*)^{0.2} \quad (6)$$

The wall temperature is taken as the minimum of 1300K and the post-shock temperature for the top surface, and taken as the flow-field interpolated stream-surface temperature for the bottom surface. Conditions for which the wall temperature is limited to 1300K result in locally required cooling.

The waverider shape is defined simultaneously in Cartesian and spherical coordinates, (r, θ, φ). The leading edge is defined by the intersection of the projected base-plane quartic curve and the conical shock, and the subsequent streamlines at each discrete leading edge location are integrated through the flow field until the base plane is reached, defining the bottom surface.

The upper surface represents the primary generating geometry for the present work, and used herein is an inverted quartic curve with selectable parameters for width, w, wingtip-to-centerline vertical thickness, $T_h$, vertical position in the conical flowfield, $y_0$, and top-center radius of curvature, $R_c$. The resulting base-plane equation is given by $$x \in [-w/2, w/2] \quad (7.\text{a})$$

$$y(x) = T_h - y_0 + \frac{3T_h - \frac{w}{4}\tan(\psi)}{w^4} + \frac{1}{2R_c}x^2 - \quad (7.\text{b})$$

$$16\left(\frac{w^2}{4R_c}\right)x^4 + \frac{\left(\frac{8w^2}{R_c} - 16w\tan(\psi) + 128T_h\right)}{w^6}x^6$$

Figure 5:
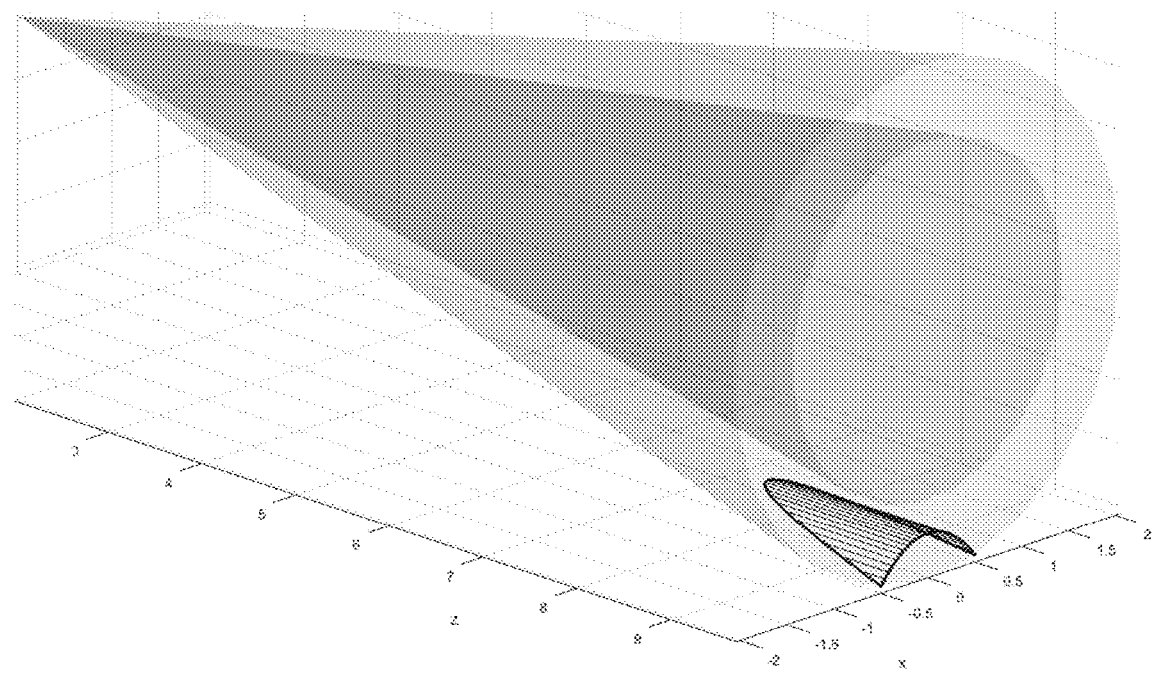
FIG. 5 shows a base-plane generating curve and forward projection to define the leading edge.

It is noted that to produce a flat-top waverider, set the thickness parameter and wingtip angles to zero and take the limit of infinite central curvature radius. Since this produces a flat-top generating curve, the projection onto a conical shock produces a textbook parabolic conic section leading edge, and subsequent emanating streamlines produce a finite-thickness vehicle due to the downward deflection of the stream surface. The generalized upper surface base-plane generating curve produces the leading edge by projecting the generating curve forward onto the cone surface, constituting a free-stream oriented stream surface, as depicted in FIG. 5.

The top surface must be everywhere tangent to the free-stream flow to satisfy the zero disturbance condition chosen as a constraint for the present work. The top surface may be treated as an expansion surface, where the Method of Characteristics is used to compute a reduced vehicle volume that optimally expands the upper surface flow in order to boost the lift coefficient. For the present work, the top surface is kept tangent to the stream surface in order to both minimize flow disturbances and to maintain internal volume of the vehicle. The requirements or constraints on the upper surface include: (1) All points must lie below the horizontal plane containing the cone vertex [(A) This ensures that the vehicle is a lifting body; (B) this also ensures that the lower surface is properly defined by the flow field; (C) the generating curve may lie partially inside the imaginary generating body; (D) the streamlines will be sufficiently deflected so that the resulting lower surface is between the shock and the generating body]. (2) Must be defined on the base plane within the shock profile (in order to determine flow field variables with Taylor-Maccoll solution). (3) Must terminate end points 122 on the shock itself (by definition, a waverider has an attached shock wave all along its leading edge, and the end points 122 define the leading edge limits).

The termination the upper surface occurs at the leading edge, and is numerically accomplished by parameterizing the x-y generating curve in the base plane for the axial coordinate, z(x,y). We therefore have a 3-dimensional leading edge curve defined by $$x_{LE} \in [-w/2, w/2] \quad (8.\text{a})$$

$$y_{LE}(x) = T_h - y_0 + \frac{3T_h - \frac{w}{4}\tan(\psi)}{w^4} + \frac{1}{2R_c}x_{LE}^2 - \quad (8.\text{b})$$

$$16\left(\frac{w^2}{4R_c}\right)x_{LE}^4 + \frac{\left(\frac{8w^2}{R_c} - 16w\tan(\psi) + 128T_h\right)}{w^6}x_{LE}^6$$

-continued $$z_{LE}(x_{LE}, y_{LE}) = \sqrt{x_{LE}^2 + y_{LE}^2}\Big/\tan(\theta_s) \qquad (8.c)$$

The leading edge curvature is controlled by the parameters used to shape the top-surface generating curve in the base plane. The wingspan, the wingtip angle with the horizontal, the top-center-to-wingtip vertical thickness, vertical position below the horizontal plane, and the top-center surface curvature uniquely define the generating curve. Combined with a chosen shock angle, these parameters uniquely defined the leading edge and the entire top surface.

Figure 6:
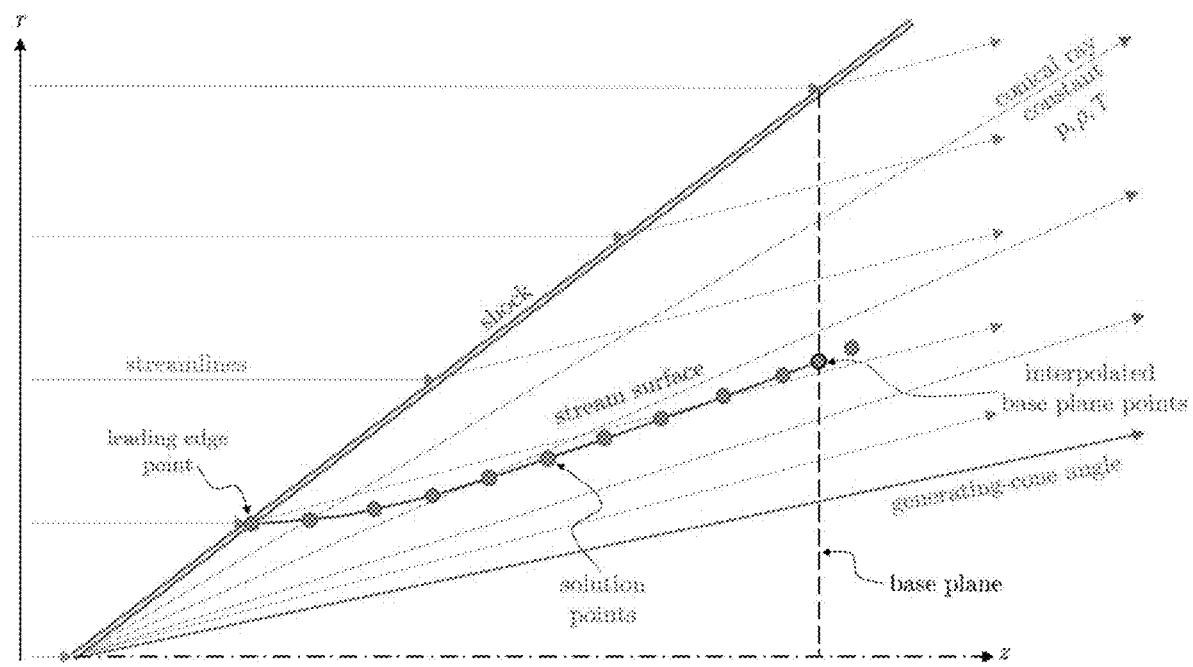
FIG. 6 shows stream surface integration from leading edge points.

The lower surface of the waverider is found by integrating the streamlines at the leading edge, forming discrete streamline points that can be interpolated into a stream surface. At each location of integration, the flow field variables can be interpolated in θ from the Taylor-Maccoll similarity solution. Since the downstream integration will bracket the base plane, cubic splines are used to interpolate the terminating point of the lower surface on the base plane. The integration concept is illustrated in FIG. 6.

Figure 7:
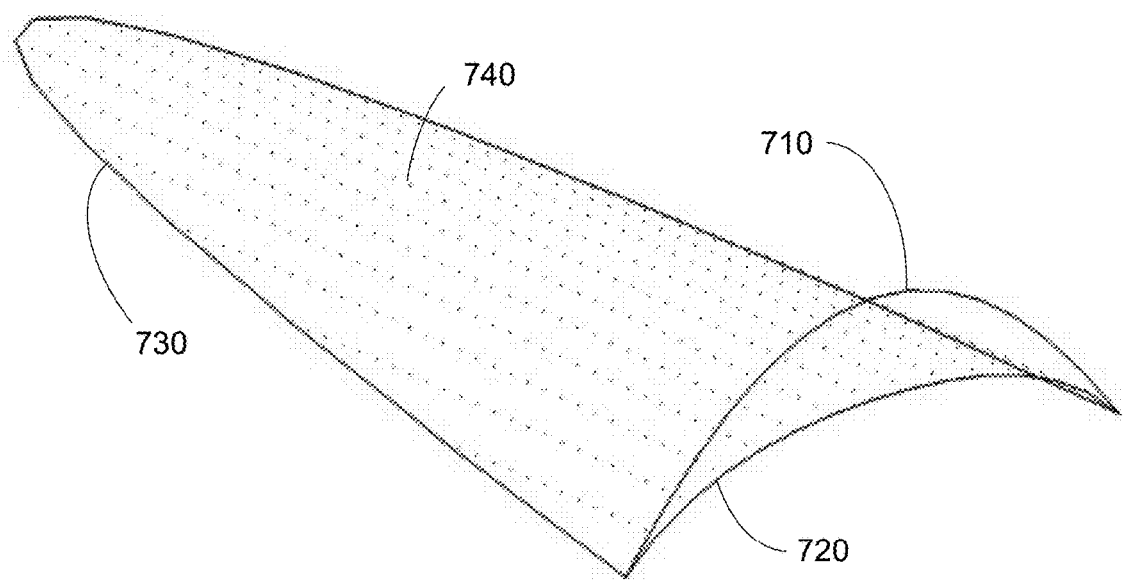
FIG. 7 shows stream surface discrete integration points and interpolated vehicle edges.

The resulting streamline points are depicted in FIG. 7 for a visually-representative solution, where the top line 710 in the base plane represents a generating curve, the lower curve 720 is the cubically-interpolated bottom surface on the base plane, and the leading edge 730 is shown with discrete piecewise line connections between the sparse integration seed points. The dots 740 indicate the deflected streamlines temporally and spatially integrated to define the lower stream surface. Note that the results in FIG. 7 are for visual illustration only; the results of the present work have been demonstrated as mesh independent to three significant figures and typically require tenfold or finer resolution of vehicle geometry and integration step size, to be discussed in the following section.

Figure 8:
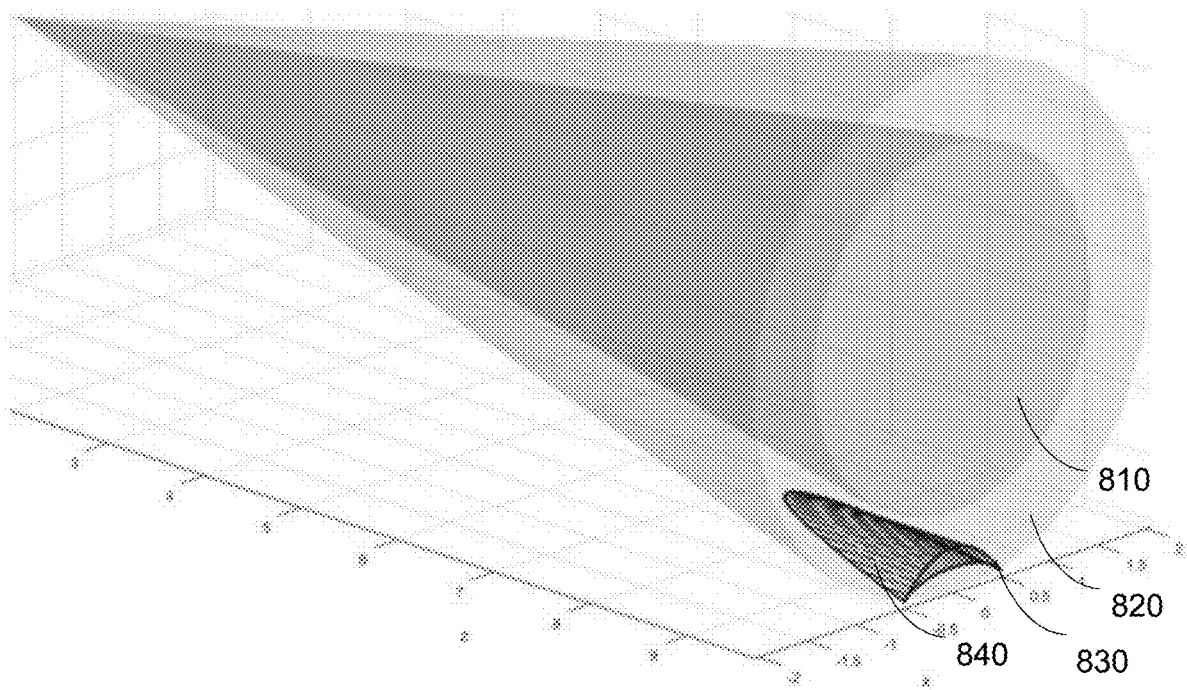
FIG. 8 shows a conical shock, imaginary generating body, and exemplary waverider.

The composite vehicle is presented in FIG. 8 for a representative 11 degree conical shock at Mach 6 and an inverted parabolic generating curve. The imaginary generating body 810 is shown interior to the shock 820, the vehicle is shown at 830, and the stream surface streamlines are shown at 840. Note that the vehicle does not need to lie entirely under the imaginary body; the generating surface must only lie below the horizontal plane that intersects the axis.

Figure 9:
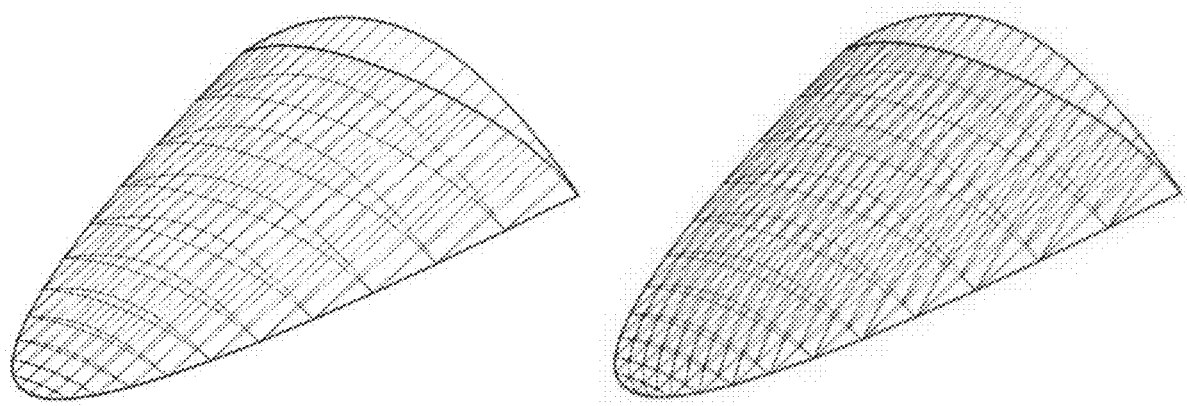
FIG. 9 shows an exemplary wireframe representative surface (left) and triangle-paneled surface for computing performance metrics (right)

The vehicle surface, having a top defined by base plane generating-curve projection and bottom defined by stream surface integration, is paneled with right triangles to produce the simple planar surfaces that are used to compute discrete contributions to the lift and drag. The wireframe representation of the geometry with blue-highlighted edges and the right-triangle paneled geometry are depicted in FIG. 9 for 1262 surface panels for visual representation. The mesh-independent results generally require 51 equally spaced generating-curve points, corresponding to surfaces constructed of 2524 triangular panels to achieve three significant figures of performance metric convergence. The area centroid and the normal vectors may be computed for each discrete panel. The incremental area is simply half the product of the base and the axial-direction length. The bounded volume may be computed with the vertical coordinate and reference area using the Midpoint Method of integration.

Each panel in the defining surface geometry is considered wetted area, and the total area for purposes of viscous effects is defined as the sum of each panel's area. The reference area, S, is computed by projecting the leading edge onto the x-z plane and integrating from the leading edge projection to the base plane. The total volume bounded by the surface may be computed with the vertical coordinate and projected reference area per panel using the Midpoint Method of integration. The volume is computed between the lower surface and the x-z plane, and then the volume between the upper surface and the x-z plane is subtracted from this. The net is the approximate volume between both surfaces and all of the detailed geometric properties are observed to converge with increased resolution. While there are, in principle, multiple methods for constructing waverider geometry, this particular construction method is conceptually simple and straightforward to implement.

A key point to reiterate is that the described waverider construction method results in necessarily sharp edges, which is impractical for an engineered vehicle because the heat concentration at the leading edge approximately scales inversely with the square root of the leading edge radius of curvature, resulting in a singularity for an ideally sharp leading edge when using that relation. In practice, a realized waverider must have finite thickness and finite-radius edges, resulting in performance degradation compared to the approximations used in the present work. However, slight deviations from the design geometry or design freestream operating conditions still result in significant performance advantages compared to non-waveriders and minimal degradation compared to the approximation methods detailed herein.

Given the highly localized nature and high relative magnitude of stagnation point heating, it is predicted that, compared to a practically engineered waverider, the overall heat load may be slightly underestimated, and leading edge blunting will increase overall heating. Further, the peak heat load may be moderately underestimated because approximations compute area heating just aft of leading edge, but not at the leading edge itself. Moreover, the drag coefficient may be slightly underestimated because leading edge blunting will increase drag. Finally, the lift coefficient and lift-to-drag ratio may be slightly overestimated because leading edge blunting may result in shock detachment and provide an escape avenue for the pocket of high pressure air providing compression lift and may also increase drag.

The difference between a practically engineered waverider and the approximations used in the present work are difficult to quantify or characterize without a full three-dimensional computational fluid dynamics simulation with a coupled vehicle thermal mass, specified geometry modifications, and potentially applying applicable models for reactive or rarefied flow. The present study, in contrast, maintains the sharp leading edge approximate geometry, assumes non-reacting continuum flow, and on-design steady state operation with respect to vehicle dynamics and the flow field dynamics. These assumptions enable low-cost numerical solutions that may be efficiently solved in large parametric sets.

A convergence study was performed for a particular sample geometry to investigate the sensitivity of the solution to resolution of the surface. Convergence to within approximately 0.1% of the lift to drag ratio was obtained for 51 leading edge points, corresponding to 2524 surface panels. With a desired accuracy of within 1%, only approximately 100 panels are needed.

A critical concept in the construction of waverider geometry is that the Mach number is a free parameter that must be chosen to uniquely define the post-shock deflected stream surface; i.e., each Mach number selected will result in a different bottom surface geometry for an otherwise identical vehicle. The implication of this postulate is that waveriders are, in principle, point-designed vehicles, in the sense that each fully constrained point in parametric space uniquely defines the vehicle geometry. Deviations from operating at this design point, such as a non-zero angle of attack or a different Mach number, will result in performance degradation. While it has been noted in the preceding section that small deviations from this design point generally result in small adverse effects on the performance metrics, it is additionally noted that moderate deviations from this design point can result in substantially degraded performance. The cases of a continually-propelled steady cruise vehicle or an equilibrium glide vehicle pitching to maintain constant Mach number comprise the strict cases in which a waverider operating on its design point is valid. An accelerating vehicle approaching its cruise condition, an atmospheric entry vehicle undergoing deceleration from orbital- to surface velocity, and a conventional flight path followed by a supersonic transport aircraft each represent operational concepts that preclude the use of conventional waveriders due to the wide range of desired operating conditions and deviations from a central design point that these applications would require.

Figure 10:
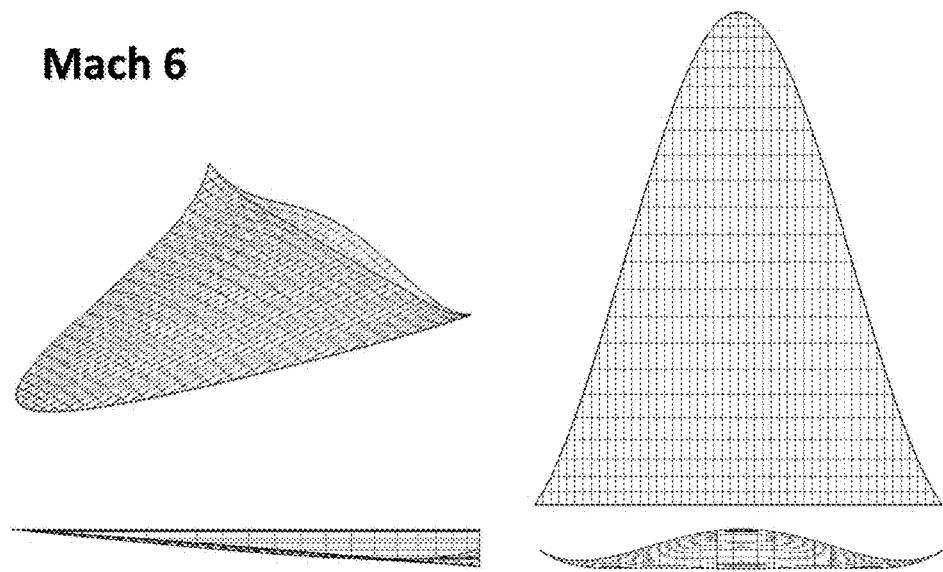
FIG. 10 shows an exemplary wireframe waverider configuration at Mach 6.
Figure 11:
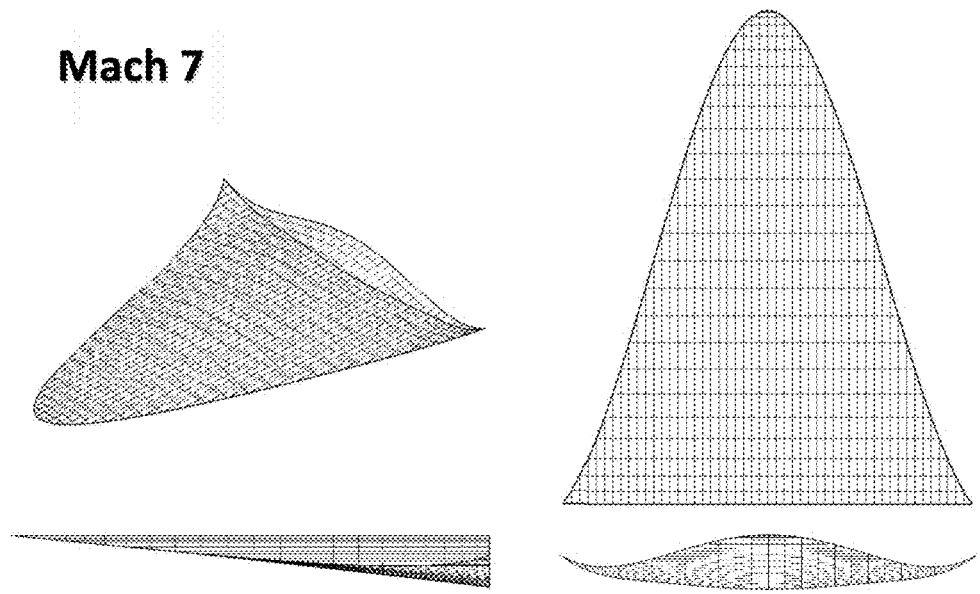
FIG. 11 shows an exemplary wireframe waverider configuration at Mach 7.
Figure 12:
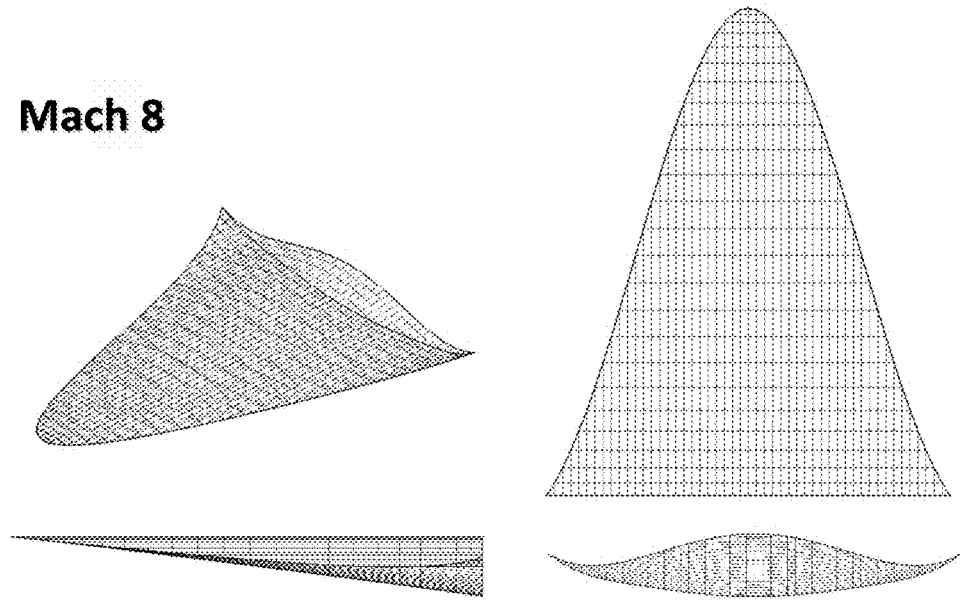
FIG. 12 shows an exemplary wireframe waverider configuration at Mach 8.

While the post-shock deflected stream surface that defines the lower surface of the proposed vehicle is uniquely defined by the design and operational parameters, and any variation in these conditions will alter the shape of the surface, as illustrated in FIGS. 10-12, parametric investigations have revealed that the area of the lower surface remains approximately constant, particularly for Mach numbers in the upper hypersonic regime. While the curvature of the stream surface changes, the approximately-constant area implies that proper shaping of the stream surface as a function of Mach number will theoretically enable operation at the effective on-design conditions that result in substantially improved performance. A corollary with regard to a realistically engineered vehicle is to note that the deviations from the exact design condition mandated by a non-sharp leading edge and a finite leading edge thickness do not significantly degrade the performance compared to an ideally sharp leading edge, which suggests that small deviations in the stream surface shape for an actuated surface compared to a rigid, ideal stream surface are similarly unlikely to result in substantially degraded performance. The practical implementation then becomes a two-fold approach, one from the aerodynamics perspective to optimize the performance metrics across the design range while engineering survivable heating conditions, and one from the structural and materials perspective to implement volume- and weight-efficient actuation mechanisms as well as the material, surface treatment, and stiffness of the stream surface in order to properly flex across the design range while surviving the intense heating, pressure, and possibly reacting flow encountered by such a vehicle. Effectively, the operational design point is turned into a practical operational design range of Mach numbers by the observation of this parametric solution set that a particular generating curve and leading edge produce a variably-curved, yet approximately constant-area stream surface.

A feature to note from exemplary waverider profiles designed for a fixed dynamic pressure, as would be required for air-breathing propulsion systems, is that higher volume efficiency occurs for higher Mach numbers. As the Mach number decreases, the stream surface is deflected less from the leading edge and the total volume enclosed is reduced. It is observed through numerical investigations that the further from the minimum conical shock angle the vehicle is constructed from, the smaller the deviations in area. However, moving further from this minimum shock angle also results in less desirable performance metrics. For example, an exemplary Mach 25 waverider is capable of a lift-to-drag ratio of at least twice as high for a conical shock angle of 2.5°, but the requirement for operation down at Mach 10 restricts the minimum shock angle to approximately 5.74°. The utility here is a performance compromise of higher-Mach speeds in order to use flexible stream surfaces to enable performance across a wide range of Mach numbers. It is recommended, then, that a designer who intends operation across a particular range of Mach numbers to impose optimization of the volume efficiency at the low-end and pursue lift and drag optimization at the high-end of the desired range. The lift-to-drag ratio will improve for all lower Mach numbers, while the volume efficiency will improve for all higher Mach numbers.

The Mach Number Independence Principle suggests that the flow field geometry approaches a limiting condition as the Mach number grows larger for otherwise fixed parameters. While the relative difference between Mach 10 and 15 is substantial in exemplary waveriders, the geometric differences between 20 and 25 are minimal: they are almost visually indistinguishable. The variation between high Mach number waverider geometry suggests that approximate geometry may possibly be used even without flexible accommodation, likely with performance penalties, for Mach numbers greater than about 20.

In an exemplary case in which the altitude is held constant while the speed is varied, it is again observed that as the speed reaches a value for which the shock angle is near the minimum shock angle, the lift-to-drag ratio rises significantly higher than the high-Mach case. It is also, again, observed that the volumetric efficiency is maximized at the high-Mach condition.

The stream surface is constructed using the ideal inviscid deflection of the post-shock flow field, and as a result, represents a minimum potential in the pressure gradient field. In other words, the location of the stream surface according to inviscid theory is a stable equilibrium. Deviations above or below the preferred deflection of the post-shock flow will result in a local pressure gradient that will act to drive the surface into the preferred position for optimal performance. The caveat is that this is an implication derived from inviscid theory for construction and is assumed a steady phenomenon: there is certainly potential for surface oscillation and traveling waves induced by an under-damped vehicle lower surface, generally referred to in aerospace as structural "flutter." Consideration of these potential instabilities, whether advantageous or entirely disadvantageous, mandates the numerical solution of strongly coupled, fully viscous, fluid-structure interactions. The linear stability of the location of the stream surface further implies that a minimum control force and power is required to maintain the stream surface in the optimal position for each Mach number.

The additional implication of stability is that comprehensive knowledge of the flow field and preferred stream surface geometry is not necessarily required: neglecting the flexure resistance to shaping of the actual vehicle lower surface itself, the preferred location of each control point on the stream surface is characterized by a minimum in the flow field potential gradient, suggesting that this also corresponds to a minimum in the applied force to each control actuator. A closed control loop may therefore implement continual perturbations during flight, where the actuators return to the location that results in a minimum of applied force required.

The practical implementation of such a control scheme may additionally require consideration of flexure forces and preferred curvature of the vehicle's lower surface.

Figure 13:
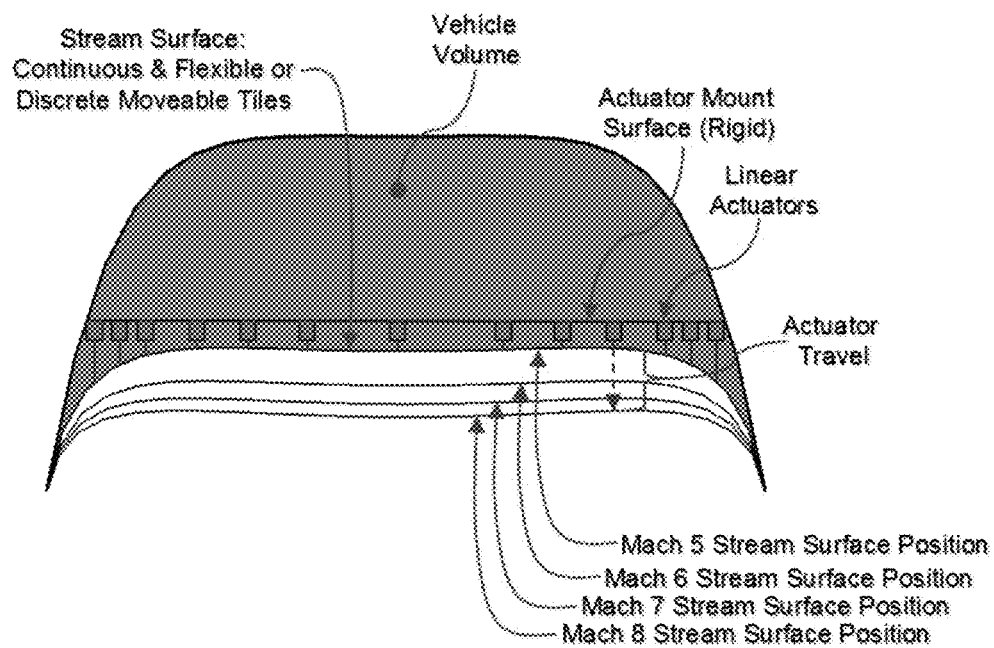
FIG. 13 shows a schematic cross-sectional view of an exemplary waverider having actuators to control waverider configuration.

Options identified for shaping mechanisms include an array of internal linear hydraulic or mechanical actuators as shown in FIG. 13, shape memory alloy actuators, a shape memory alloy stream surface, and potentially using the internal stream surface structure itself as a function of stress or temperature to flex into the design curvature passively for each operating condition. The latter includes two general mechanisms, the first being sufficient internal ribbing that biases flexure to enable the preferred stream surface shaping. The second is an internal structure of unequal thermal expansion coefficients designed to passively produce curvature based on the external heating conditions, presumed to be a known and fixed function of altitude and flight speed. Precision is the primary advantage to implementing a hydraulic or mechanical actuator, while the disadvantage is the additional mass and volume such a mechanism would occupy.

In summary, a morphing waverider is designed by fixing the shock, the top surface, and the leading edge and varying the lower "stream surface" as a function of Mach number. Such a morphing design adds degrees-of-freedom that are inherently valuable compared to non-morphing (i.e. "rigid") vehicles. Indeed, exemplary morphing vehicle can outperform a rigid vehicle at higher speeds and act rigid at lower speeds in order to yield highest L/D overall. Lift coefficient and drag coefficient can also be alternately targeted for optimization, although herein L/D has been the desired metric. It is noted that, because area is held essentially constant, strain on the lower stream surface can be minimized below 0.1% across Mach 10-30, compared to the 2% elastic limit for conventional metals. This optimization still yields a relatively high and consistent L/D (4:1) across Mach 10-30. The design condition that achieves minimum strain is the transition from a concave to a convex lower stream surface across the design speed range. However, peak strain can be traded-off with aerodynamic performance based on desired optimization metrics Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of designing a hypersonic waverider vehicle, the method comprising the steps of:
   selecting a shock shape;
   tracing a leading edge along the shock shape;
   selecting a base plane defining endpoints of the leading edge and rearwardly displaced from a front of the leading edge; and
   tracing stream surfaces back from the leading edge along the shock to the base plane in order to define an upper surface and a lower surface, wherein the upper and lower surfaces and base plane enclose a volume representing internal volume of the hypersonic waverider vehicle, and
   wherein the lower stream surface is controllably morphable.

2. A hypersonic waverider vehicle comprising:
   a leading edge;
   a base defining ends of the leading edge;
   an upper surface extending from the leading edge to the base; and
   a lower surface extending from the leading edge to the base, wherein the lower surface is controllably morphable,
   wherein the upper and lower surfaces and base enclose an internal volume of the hypersonic waverider vehicle.

3. The hypersonic waverider vehicle of claim 2, further comprising a plurality of actuators configured to morph the lower surface in reaction to flight conditions.

4. The hypersonic waverider vehicle of claim 2, wherein the lower surface is unitary.

5. A method of controlling a hypersonic waverider vehicle, the method comprising the steps of:
   sensing a force applied by one or more actuators;
   actuating, via the one or more actuators, a unitary morphable lower surface of a hypersonic vehicle to a shape resulting in a minimum of applied force from each of the one or more actuators.

\* \* \* \* \*